(12) United States Patent　　(10) Patent No.: US 12,578,293 B2

Berggren et al.　　(45) Date of Patent: Mar. 17, 2026

(54) SYSTEM, DEVICE AND METHOD FOR DETECTION AND IDENTIFICATION OF SPECIES IN A SAMPLE WITH AN IONIC EXCHANGE MEMBRANE

(71) Applicant: Oboe IPR AB, Linköping (SE)

(72) Inventors: Magnus Berggren, Linköping (SE); Daniel Simon, Linköping (SE); Dennis Cherian, Kerala State (IN); Klas Tybrand, Linköping (SE)

(73) Assignee: Oboe IPR AB, Linköping (SE)

(*) Notice: Subject to any disclaimer, the term of this patent is extended or adjusted under 35 U.S.C. 154(b) by 218 days.

(21) Appl. No.: 18/553,086

(22) PCT Filed: Mar. 29, 2022

(86) PCT No.: PCT/SE2022/050303
§ 371 (c)(1),
(2) Date: Sep. 28, 2023

(87) PCT Pub. No.: WO2022/211707
PCT Pub. Date: Oct. 6, 2022

(65) Prior Publication Data
US 2024/0183809 A1　Jun. 6, 2024

(30) Foreign Application Priority Data

Mar. 30, 2021　(SE) .................................... 2150389-1

(51) Int. Cl.
*G01N 27/02*　(2006.01)
*G01N 27/333*　(2006.01)
*G01N 27/447*　(2006.01)

(52) U.S. Cl.
CPC ........... *G01N 27/02* (2013.01); *G01N 27/333* (2013.01); *G01N 27/4473* (2013.01)

(58) Field of Classification Search
CPC .. G01N 27/02; G01N 27/333; G01N 27/4473; G01N 27/31; G01N 27/028
See application file for complete search history.

(56) References Cited

U.S. PATENT DOCUMENTS

| | | | |
|---|---|---|---|
| 4,871,427 | A | 10/1989 | Kolesar, Jr. |
| 5,415,746 | A | 5/1995 | Cha |

(Continued)

FOREIGN PATENT DOCUMENTS

| | | |
|---|---|---|
| CA | 2661642 A1 | 2/2008 |
| JP | H06-229977 A | 8/1994 |

(Continued)

OTHER PUBLICATIONS

Díaz, José C., et al., "Ionic conductivity of ion-exchange membranes: Measurement techniques and salt concentration dependence", Journal of Membrane Science, Jan. 15, 2021 (online—Sep. 6, 2020), pp. 118717-118718, vol. 618, Elsevier, BV, Netherlands.

(Continued)

*Primary Examiner* — Amy He
(74) *Attorney, Agent, or Firm* — Alston & Bird LLP

(57)　　ABSTRACT

The present disclosure relates to a system (100) for detection and identification of at least one species in a sample in an ionic exchange membrane (110), comprising an ion exchange membrane (110), an impedance analyser (120), source (141) and target electrodes (142), a voltage and/or current source (140) arranged to provide an electric potential difference, a computer (170), and at least two impedance electrodes (121, 122) arranged at the ion exchange membrane (110) and connected to the impedance analyser (120). The source (141) and target electrodes (142) are connected to said source (140), and are arranged to upon addition of source (151) and target electrolyte (152) be in ionic contact with a first (111) and second region (112) of the ion exchange membrane (110) respectively. The computer (170)

(Continued)

100 is arranged to obtain source data comprising voltage data and/or current data from said source (140); obtain impedance data from the impedance analyser (120); and determine the presence of said at least one species in said sample based on the obtained source data, the obtained impedance data, and predetermined reference data for the ion exchange membrane (110).

9 Claims, 5 Drawing Sheets

(56)                References Cited

U.S. PATENT DOCUMENTS

| | | | |
|---|---|---|---|
| 2013/0327647 | A1 | 12/2013 | Ohira et al. |
| 2020/0049690 | A1 | 2/2020 | Slouka et al. |

FOREIGN PATENT DOCUMENTS

| | | | | |
|---|---|---|---|---|
| JP | 2008-241473 | A | 10/2008 | |
| WO | WO-2015179712 | A1 * | 11/2015 | ......... G01N 27/3276 |
| WO | WO 2018/118836 | A1 | 6/2018 | |

OTHER PUBLICATIONS

Dlugolcki, Piotr, et al., "On the resistances of membrane, diffusion boundary layer and double layer in ion exchange membrane transport", Journal of Membrane Science, Mar. 1, 2010 (online—Dec. 4, 2009), pp. 369-379, vol. 349, No. 1-2, Elsevier, BV, Netherlands.

International Searching Authority, International Search Report and Written Opinion received for International Application No. PCT/SE2022/050303, dated Jun. 20, 2022, 16 pages, European Patent Office, Netherlands.

Swedish Patent and Registration Office, Search Report received for Application No. 2150389-1, dated Dec. 14, 2021, 2 pages, Sweden.

Zhao, Zhijuan, et al., "Electrochemical impedance spectroscopy and surface properties characterization of anion exchange membrane fouled by sodium dodecyl sulfate", Journal of Membrane Science, May 15, 2018 (online—Feb. 24, 2017), pp. 220-231, vol. 530, Elsevier, BV, Netherlands.

* cited by examiner

300

Provide Ion Exchange Membrane
310

Provide Sample
320

Provide Electrical Potential Difference
330

Measure Impedance
340

Obtain Reference Data
350

Determine Presence of Species
360

400

SYSTEM, DEVICE AND METHOD FOR DETECTION AND IDENTIFICATION OF SPECIES IN A SAMPLE WITH AN IONIC EXCHANGE MEMBRANE

CROSS REFERENCE TO RELATED APPLICATIONS

This application is a National Stage Application, filed under 35 U.S.C. § 371, of International Application No. PCT/SE2022/050303, filed Mar. 29, 2022, which international application claims priority to and the benefit of Swedish Application No. 2150389-1, filed Mar. 30, 2021; the contents of both of which are hereby incorporated by reference in their entirety.

BACKGROUND

Related Field

The present disclosure relates detection and identification of species in a sample with ionic exchange membranes.

Description of Related Art

Identifying species in a fluid sample, such as performing water sample analysis, is of critical importance in the fields of chemistry and biology. Historically identifying species in a sample was typically indirect in nature, such as via determining the pH or the conductivity of a water sample. Over the years a multitude of techniques for detecting species in a sample have been developed, such as capillary electrophoresis which may separate a plurality of species in a sample inside a capillary based on electrophoresis and detect each of said species at a point along the capillary.

With the emergence of microfluidics the footprint of species detection systems and the sample size required may be significantly reduced. The smaller dimensions of microfluidic systems may also allow improved sample handling, sample separation, and species detection.

A challenge with using many existing techniques for detecting species in a sample is to reliably identify species in complex samples comprising a plurality of species. There is a need for more robust systems for detecting species in a sample.

BRIEF SUMMARY

One object of the invention is to provide improved species detection and identification utilizing ion exchange membranes.

This has in accordance with the present disclosure been achieved by means of a system for detection and identification of at least one species in a sample in an ionic exchange membrane. The system comprises an ion exchange membrane, at least two impedance electrodes, an impedance analyser, a source electrode, a target electrode, a voltage and/or current source and a computer. The at least two impedance electrodes are arranged at the ion exchange membrane and are connected to the impedance analyser. The source electrode and a first region of the ion exchange membrane are arranged to, upon addition of a source electrolyte at said first region, be in indirect ionic contact via said source electrolyte. The target electrode and a second region of the ion exchange membrane are arranged to, upon addition of a target electrolyte at said second region, be in indirect ionic contact via said target electrolyte. The source electrode and the target electrode are connected to said voltage and/or current source.

Said voltage and/or current source is arranged to form a closed electrical circuit upon addition of the source electrolyte at the first region of the ion exchange membrane and addition of the target electrolyte at the second region of the ion exchange membrane. Said voltage and/or current source is further arranged to provide an electric potential difference between the first and second region of the ion exchange membrane.

The computer is arranged to obtain source data comprising voltage data and/or current data from said voltage and/or current source, obtain impedance data from the impedance analyser, obtain reference data comprising for each of said at least one species a set of values indicative of diffusion coefficients and reference impedances data for said species in the ion exchange membrane, and determine the presence of said at least one species in said sample based on the obtained source data, the obtained impedance data, and obtained predetermined reference data.

This has the advantage of allowing species to be determined based on a combination of their electrophoretic migration rate through the ion exchange membrane and their impedance response upon entering the sensing area of the impedance electrodes. This has further the advantage of providing an integrated chromatography technique for the analysis of ions.

In some examples the system further comprises a source reservoir arranged to contain the source electrolyte and a target reservoir arranged to contain the target electrolyte, wherein the source, target electrode, the first region and the second region of the ionic exchange membrane are at least partially arranged in or at each respective reservoir.

This has the advantage of allowing added source electrolyte and target electrolyte to be contained prior to and during operation of the system. In some examples these systems may function as portable testing kits, such as a testing kit for waste water or drinking water.

In some examples the system is arranged to update the reference data for the ion exchange membrane based on performing a calibration of the system utilizing a known reference sample.

This has the advantage of allowing the system to update the reference data to handle new situations, such as performing measurements with new solvents or new species. This further allows the system to retain some functionality in the event of the ion exchange membrane itself changing its properties, such as exposed ion exchange membrane to an electrolyte that irreversibly changes it.

In some examples the ion exchange membrane is a replaceable ion exchange membrane.

This has the advantage of allowing an unreliable or underperforming ion exchange membrane to be replaced. This further has the advantage of allowing the same system to use a plurality of different ion exchange membranes suitable for different measurements.

In some examples at least one pair of impedance electrodes are arranged at different sides of the ion exchange membrane to form a sandwich-structure in a region.

This has the advantage of allowing a pair of impedance electrodes with a suitable spacing to provide an impedance measurement of the volume between said impedance electrodes.

In some examples the system comprises at least four impedance electrodes. In some of these examples said at least four impedance electrodes are arranged at said ion exchange membrane as at least two pairs of impedance electrodes, wherein each pair of impedance electrodes and said impedance analyser is arranged to measure impedance in a part of the ion exchange membrane.

This has the advantage of allowing at least two pairs of impedance electrodes to each measure impedance at different areas of the ion exchange membrane. This further has the advantage of allowing the computer to obtain impedance measurement recordings of species entering the ion exchange membrane and of said species passing a subsequent pair of electrodes, whereby the computer may perform an improved determination of species.

In some examples the system comprises microfluidic means arranged to provide sample to be analysed at the ion exchange membrane.

This has the advantage of allowing improved control of sample transport to the ion exchange membrane and thereby an improved control of the amount and timing of sample entering the ion exchange membrane.

In some examples the system wherein the voltage and/or current source is arranged to record the voltage and the current, and wherein the computer is arranged to provide a faulty system measurement states error based on obtained voltage and current information from said source.

This has the advantage of allowing the computer to determine if the closed circuit through system exhibits an unexpected relation between potential and current. In an example situation, if after addition of both electrolytes an applied potential results in a current that is orders of magnitude below the expected current it may indicate an insufficient hydration of the ion exchange membrane.

The present disclosure further relates to a device for detection and identification of at least one species in a sample in an ion exchange membrane. The device comprises an ionic exchange membrane, and at least two impedance electrodes arranged at the ionic exchange membrane, wherein the device is arrange for use in the disclosed system.

This has the advantage of allowing devices comprising the ion exchange membranes and impedance electrodes to be used as a replaceable part in the system for detection and identification of species in a sample with an ionic exchange membrane. This may further allow a set of devices with different properties to each be used to adapt said system for different measurement conditions in order to improve detection of species or improve separation of a plurality of species.

The present disclosure further relates to a method for detection and identification of at least one species in a sample in an ionic exchange membrane, the method comprises the steps of providing a ion exchange membrane, at least two impedance electrodes arranged at said ion exchange membrane, a source electrolyte at a first region of the ion exchange membrane, and a target electrolyte at a second region of the ion exchange membrane, providing said sample possibly comprising said at least one species at the ion exchange membrane, providing an electrical potential difference between the first and second region of the ion exchange membrane by applying a potential difference between a source electrode in ionic contact with the source electrolyte and a target electrode in ionic contact with the target electrolyte, measuring impedance between the at least two impedance electrodes by applying an alternating voltage in the frequency range of 1 kHz to 1 MHz, and recording the potential difference between and/or current through the source electrode and target electrode, obtaining predetermined reference data for the ion exchange membrane comprising for each of said at least one species a set of values indicative of diffusion coefficients and reference impedances data corresponding to said species, and determining the presence of said at least one species in said sample based on the recorded voltage and/or current, the measured impedance, and the predetermined reference data for the ion exchange membrane.

The present disclosure further relates to a computer program product comprising a non-transitory computer-readable storage medium having thereon a computer program comprising program instructions, the computer program being loadable into a processor and configured to cause the processor to perform the method for detection and of species in an ionic exchange membrane.

DETAILED DESCRIPTION OF VARIOUS EMBODIMENTS

Figure 1A:
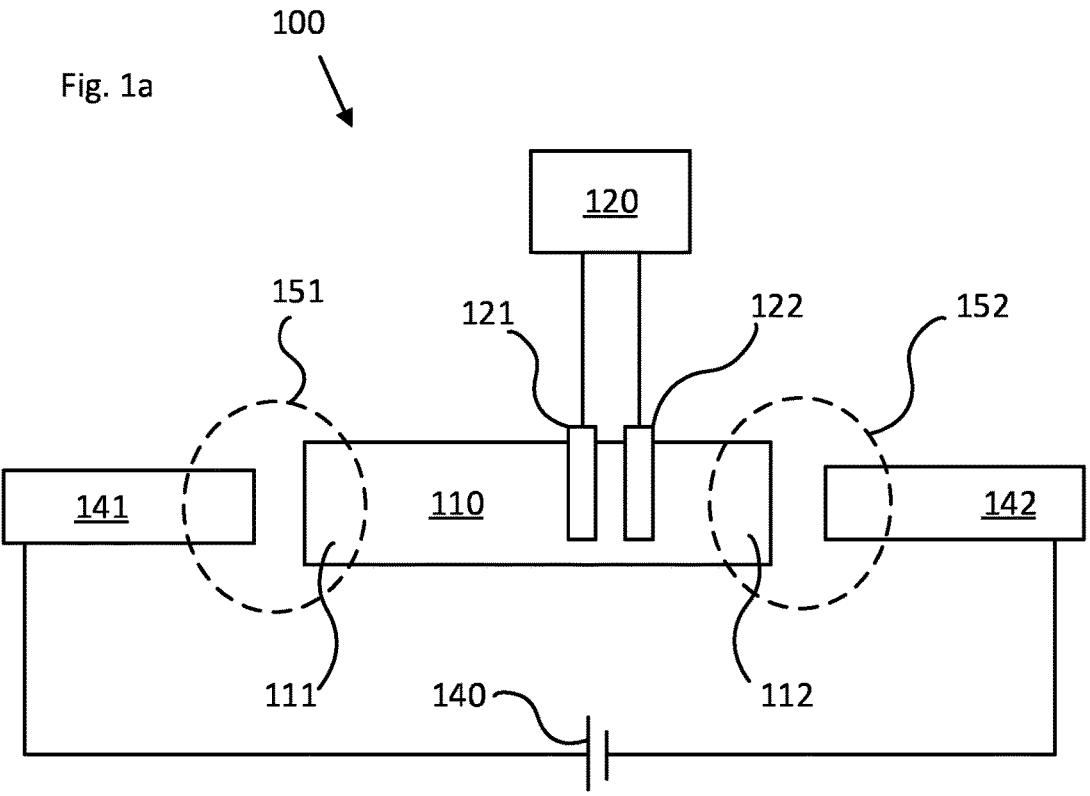
FIG. 1a-c show schematically a system for detection and identification of at least one species in a sample in an ionic exchange membrane.

Throughout the figures, same reference numerals refer to same parts, concepts, and/or elements. Consequently, what will be said regarding a reference numeral in one figure applies equally well to the same reference numeral in other figures unless not explicitly stated otherwise.

Figure 1B:
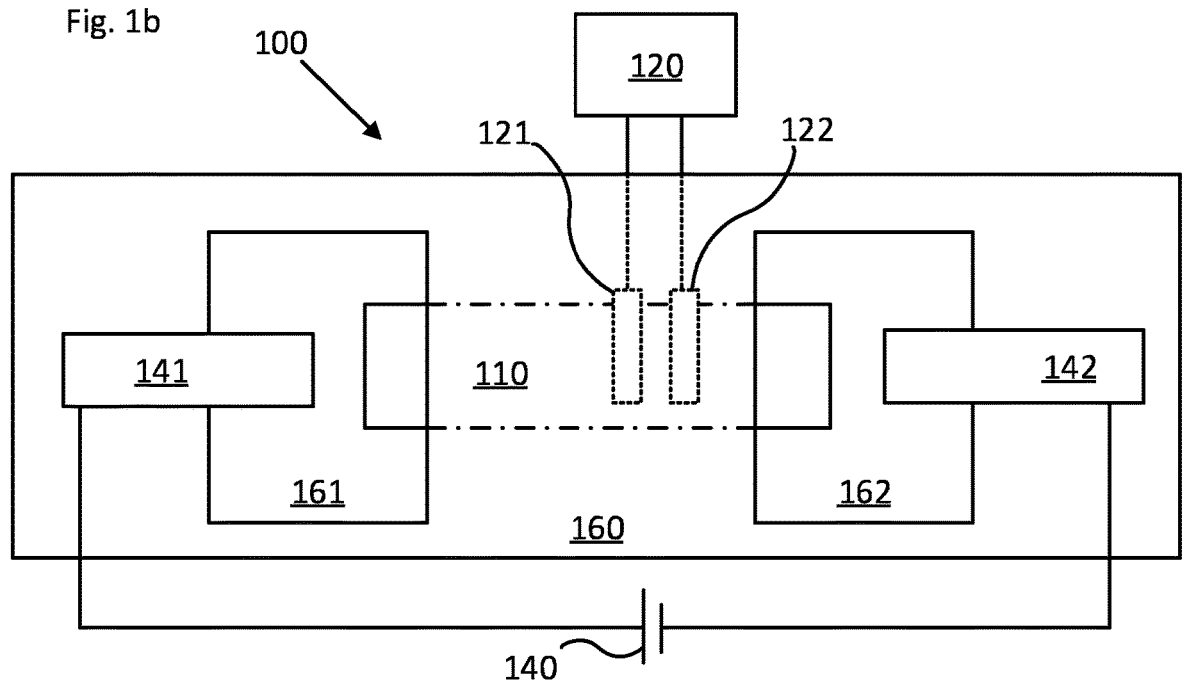
Figure 1C:
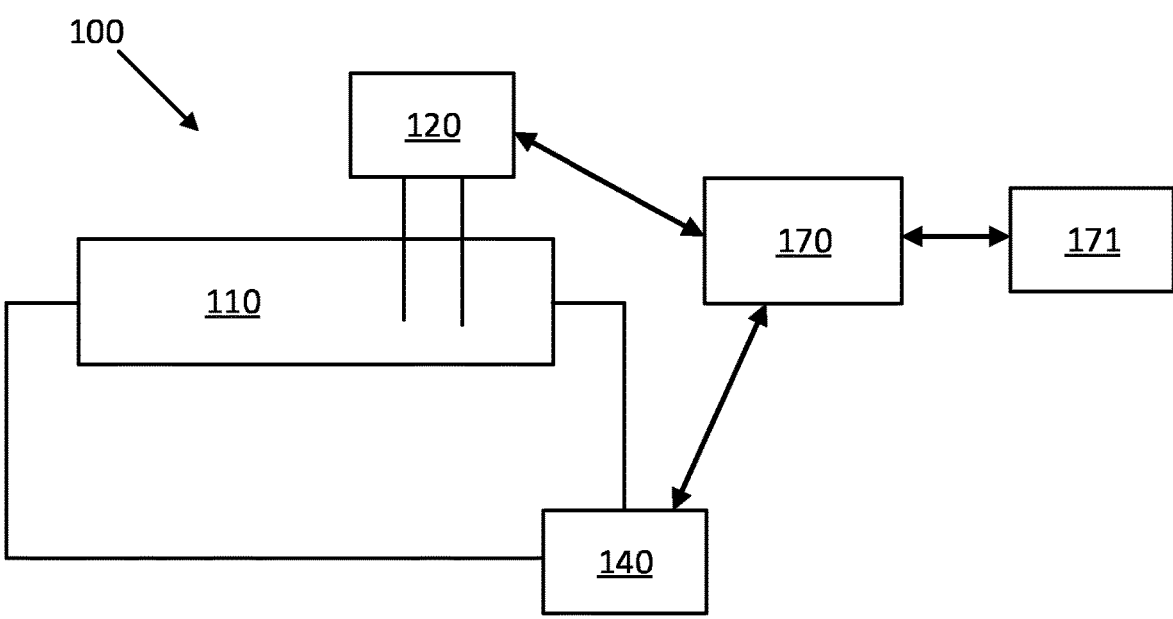

FIG. 1a-c show schematically a system for detection and identification of at least one species in a sample in an ionic exchange membrane. FIG. 1a schematically depicts the components of an example system surrounding the ionic exchange membrane and the electrolytes the system interacts with. FIG. 1b schematically depicts a top-down illustration of the same example system further comprising a housing surrounding parts of the ionic exchange membrane and reservoirs for the electrolytes. FIG. 1c schematically depicts the devices of the system acting upon and/or measuring the ionic exchange membrane. It should be noted that the FIG. 1a-c do not aim to represent the relative sizes of the illustrated features.

FIG. 1a shows a system 100 for detection and identification of at least one species in a sample in an ionic exchange membrane 110. The example system 100 comprises an ion exchange membrane 110, two impedance electrodes 121,122, an impedance analyser 120, a source electrode 141, a target electrode 142 and a voltage and/or current source 140. The source electrode 141 and the target electrode 142 are connected to said source 140.

The two impedance electrodes 121,122 are arranged at the ion exchange membrane 110 and are connected to the impedance analyser 120. The two impedance electrodes 121,122 and the impedance analyser 120 being arranged to measure impedance in or at at least part of the ion exchange membrane 110. The expression of "the impedance electrode 121,122 being arranged at the ion exchange membrane 110" includes the impedance electrode 121,122 being in contact with or penetrating into part of the ion exchange membrane 110.

The source electrode 141 and a first region 111 of the ion exchange membrane 110 are arranged to, upon addition of a source electrolyte 151 at said first region 111, be in indirect ionic contact via said source electrolyte 151.

The target electrode 142 and a second region 112 of the ion exchange membrane 110 are arranged to, upon addition of a target electrolyte 152 at said second region 112, be in indirect ionic contact via said target electrolyte 152. In some examples at least part of the ion exchange membrane 110 is arranged to be hydrated by the source 151 and/or target electrolyte 152.

The voltage and/or current source 140, hereafter called source 140, and its connected electrodes 141,142 are arranged to form a closed electrical circuit through the system 100 upon addition of the source electrolyte 151 at the first region 111 of the ion exchange membrane 110 and addition of the target electrolyte 152 at the second region 111 of the ion exchange membrane 110. The source 140 is arranged to provide an electric potential difference between the first 111 and second region 112 of the ion exchange membrane 110. Upon providing an electric potential difference between the first 111 and second region 112 of the ion exchange membrane 110 charged species may undergo electrophoresis, thereby moving through the ion exchange membrane 110 and, if applicable, undergoing separation.

The system 100 further comprises a computer arranged to
obtain source data comprising voltage and/or current data from said source 140,
obtain impedance data from the impedance analyser 120,
obtain predetermined reference data for the ion exchange membrane 110, said reference data comprising for each of said at least one species a set of values indicative of diffusion coefficients and reference impedances data corresponding to said species in said ion exchange membrane 110, and
determine the presence of said at least one species in said sample based on the obtained source data, the obtained impedance data, and the obtained predetermined reference data.

In an example of using said system wherein one species is in the source electrolyte 151 the amount of time from applying a voltage across the ion exchange membrane 110 to the impedance analyser 120 detecting a change in impedance may represent a transport time of the species to move from said source electrolyte 151 to the corresponding impedance electrodes 121,122. Said transport time and measured impedance upon arrival may be indicative of a specific species, and comparing obtained transport time and measured impedance with the predetermined reference data may allow the species to be determined.

In this example said closed electrical circuit comprises at least the source 140, the source electrode 141, the target electrode 142, the source electrolyte 151, the target electrolyte 152, and the ion exchange membrane 110, wherein the electrodes 141,142 are in indirect contact with the ion exchange membrane 110 via electrolyte 151,152. In some embodiments the source electrode 141 and/or the target electrode 142 are arranged in direct contact with the ion exchange membrane 110. In some examples ion exchange membrane 110 is arranged to form a hydrated path between the first region 111 and second region 112 of the ion exchange membrane 110.

In some embodiments the source electrode 141 and/or the target electrode 142 comprise electrochemically active material, such as poly(3,4-ethylenedioxythiophene) polystyrene sulfonate, PEDOT:PSS. Utilizing electrochemically active source 141 and/or target electrodes 142 may reduce the impact on the system when performing electrochemistry at said electrodes 141,142.

In a preferred embodiments of the system, the ion exchange membrane 110 is an anion exchange membrane or cation exchange membrane with a length of 30 mm, a width of 500 μm, and a thickness of 200 μm, wherein the ion exchange membrane 110 is completely encapsulated apart from its first 111 and second region 112 in order to control the hydration of the ion exchange membrane 110.

In some embodiments the ion exchange membrane 110 has a width in a range of 50 μm-5000 μm. In some embodiments the ion exchange membrane 110 has a width in a range of 100 μm-1000 μm, a range of 200 μm-800 μm, or a range of 10 μm-10 mm.

In some embodiments the ion exchange membrane 110 has a thickness in a range of 1 μm-1000 μm. In some embodiments the ion exchange membrane 110 has a thickness in a range of 10 nm-100 nm, a range of 10 μm-100 μm, or a range of 500 μm-5 mm.

In some embodiments the ion exchange membrane 110 has a ratio between width and thickness in a range of 1-10. In some embodiments the ion exchange membrane 110 has a ratio between width and thickness in a range of 0.1-100, or a range of 3-30.

In some embodiments the shortest distance between the first 111 and second region 112 through the ion exchange membrane 110 is at least 1 mm. In some embodiments said region-to-region distance through the ion exchange membrane 110 is at least 2 mm, at least 4 mm, at least 8 mm, or at least 20 mm.

In this context the first region 111 and the second region 112 of the ion exchange membrane 110 are to be understood as the surfaces of the ion exchange membrane 110 arranged to be in contact with the source 151 and target electrolyte 152, and through which species in the source 151 and target electrolyte 152 are able to enter the ion exchange membrane via during typical use of the system 100.

In some embodiments the shortest distance between the first region 111 and/or the second region 112 and any impedance electrode 121,122 through the ion exchange membrane 110 is at least 1 mm. In some embodiments said region-to-electrode distance through the ion exchange membrane 110 is at least 2 mm, at least 4 mm, at least 8 mm, or at least 20 mm.

In some embodiments the shortest distance between the first region 111 and/or the second region 112 and any impedance electrode 121,122 through the ion exchange membrane 110 is at most 5 mm. In some embodiments said region-to-electrode distance through the ion exchange membrane 110 is at most 10 mm, at most 20 mm, at most 40 mm, or at most 100 mm.

In some embodiments the ion exchange membrane 110 comprises a bulk part consisting of organic polymer and/or inorganic polymer, wherein the bulk part constitutes at least half of the mass of the non-hydrated ion exchange membrane 110.

In some embodiments the ion exchange membrane 110 has a transport number for cations or anions of at least 0.6.

In some embodiments the ion exchange membrane 110 has a transport number for cations or anions of at least 0.7, at least 0.8, or at least 0.9.

In the example in FIG. 1a the two impedance electrodes 121,122 are arranged at the ion exchange membrane 110 and are connected to the impedance analyser 120. The two impedance electrodes 121,122 and the impedance analyser 120 being arranged to measure impedance at one part of the ion exchange membrane 110.

In a preferred embodiment of the system comprises two impedance electrodes 121,122 with a 200 μm width and 100 μm spacing, wherein the two impedance electrodes 121,122 are arranged at the ion exchange membrane 110 between the centre of the ion exchange membrane 110 and the second region 112.

In some embodiments the system 100 comprises at least two impedance electrodes 121,122. In some embodiments the at least two impedance electrodes 121,122 are arranged at the same side of the ion exchange membrane 110. In some embodiments the at least two impedance electrodes 121,122 are arranged at different sides of the ion exchange membrane 110, such as a sandwich-structure consisting of a part of the ion exchange membrane 110 and two impedance electrodes 121,122 on opposing sides. In some embodiments at least two of the at least two impedance electrodes 121,122 are each arranged to substantially follow the perimeter of a cross-section of the ion exchange membrane 110, such as a pair of impendence electrodes 121,122 each arranged at ¾ of the whole perimeter of a cross-section of the ion exchange membrane 110.

In some embodiments the at least two impedance electrodes 121,122 have a width in a range 50-500 μm. In some embodiments said at least two impedance electrodes 121, 122 have a width in a range 1-20 μm, a range 100-300 μm, a range 150-250 μm, or a range 10-1000 μm.

In some embodiments the at least two impedance electrodes 121,122 have between at least one pair of impedance electrodes 121,122 a spacing of 10-200 μm. In some embodiments the at least two impedance electrodes 121,122 have between at least one pair of impedance electrodes 121,122 a spacing of 1-20 μm, 30-100 μm, 50-70 μm, 5-400 μm, or 2-800 μm.

The term pair of impedance electrodes 121,122 refers to two impedance electrodes 121,122 arranged to be used together when performing a impedance measurement.

In some embodiments the system comprises at least two pairs of impedance electrodes 121,122 arranged at the ion exchange membrane 110 connected the impedance analyser 120, wherein each pair of impedance electrodes 121,122 and said impedance analyser 120 is arranged to measure impedance in or at least part of the ion exchange membrane 110. In some of these embodiments the pairs of impedance electrodes 121,122 are arranged at the ion exchange membrane 110 at different distance from the first region 111 of the ion exchange membrane 110, such as a first pair of impedance electrodes 121,122 being arranged at a distance of 5 mm and a second pair being arranged at 10 mm.

In some embodiments the number of impedance electrodes 121,122 arranged at the ion exchange membrane 110 and connected the impedance analyser 120 is at least five, at least six, or at least eight.

In some embodiments the at least two impedance electrodes 121,122 are integrated into the ionic exchange membrane 110. In some of these embodiments each impedance electrode 121,122 forms an electrode mesh inside said ionic exchange membrane 110.

In some embodiments the impedance analyser 120 and the at least two impedance electrodes 121,122 are arranged to measure impedance at least at 1 kHz to 1 MHz. In some embodiments the impedance analyser 120 and the at least two impedance electrodes 121,122 are arranged to measure impedance at least at 50 Hz to 500 Hz, at least at 1 Hz to 100 kHz, and/or at least at 10 kHz to 10 MHz.

The impedance data obtained from the impedance analyser 120 may comprise impedance for a plurality of frequencies.

The voltage and/or current source 140, is to be understood as a device arranged to source voltage, current, or either current or voltage. In some embodiments the source 140 is arranged to provide a substantially constant voltage during operation, such as a the voltage provided by an appropriately dimensioned battery.

In some examples of using the system 100 in FIG. 1a said sample to be analysed may be comprised in the source electrolyte 151. In some examples of using the system 100 said sample to be analysed may be introduced at or in the ion exchange membrane 110. In some examples the system 100 comprises microfluidic means arranged to provide sample to be analysed at or in the ion exchange membrane 110. In some examples the system 100 is arranged to interface with fluid transport means arranged to provide sample to be analysed at or in the ion exchange membrane 110.

FIG. 1b depicts the system 100 in FIG. 1a further comprising a housing 160 arranged to partially cover the ion exchange membrane 110, and a source reservoirs 161 and a target reservoir 162 arranged to contain the corresponding electrolytes 151,152. In this example the ion exchange membrane 110 extends into the source 161 and the target reservoir 162. At least part of the source 141 and target electrode 142 are arranged in or at the corresponding reservoir, whereby upon filling the reservoirs 161,162 with the corresponding electrolyte 151,152 the source 141 and target electrode 142 comes in indirect ionic contact with the ion exchange membrane 110.

The example system 100 depicted in FIG. 1b represents an embodiment wherein the parts of the system 100 surrounding the ion exchange membrane 110 are arranged in a planar fashion, such as a lab-on-a-chip system built on a planar substrate. In some embodiments the ion exchange membrane 110 is an elongated shape that is significantly longer than wide, and significantly wider than thick, such as cuboid being 10 mm long, 1 mm wide and 100 μm thick.

In some embodiments the system 100 is integrated into one device or unit. In some of these examples the system 100 further comprises a power source (not shown) arranged to provide electrical power to the impedance analyser 120 and the source 140. In some of these examples the source 140 comprises the power source. In some embodiments the system 100 is a portable system providing an integrated chromatography technique for the analysis of ions.

In some embodiments the system 100 is arranged such that the ion exchange membrane 110 and/or the at least two impedance electrodes 121,122 may be replaced.

In some embodiments the system 100 comprises fluidic ports (not shown) connected to the ion exchange membrane 110 for interfacing with fluid transport means.

In some embodiments the system 100 comprises a set of contact pads (not shown) connected to at least the two impedance electrodes 121,122, said set of contact pads being connectable to external electronic equipment.

In some embodiments the system 100 comprises an encapsulation surrounding at least part of the ion exchange membrane 110. In some of these embodiments the encapsulation consists of metal or ceramic material. In some embodiments the housing 160 comprises the encapsulation surrounding at least part of the ion exchange membrane 110.

In some embodiments the system 100 comprises at least one sample reservoir connected to the ion exchange membrane via passive and/or active fluid transport means, wherein said transport means are arranged to provide sample at the ion exchange membrane 110. An example of passive fluid transport means is an arrangement of narrow paths arranged to transport sample introduced into the reservoir to the ion exchange membrane via capillary action.

In some embodiments the system 100 comprises encapsulation of the ion exchange membrane, wherein said encapsulation is transparent in at least a region of the Infrared, visible and/or ultraviolet wavelength spectra. In some of these embodiments the housing 160 comprises the transparent encapsulation. The use of a transparent ion exchange membrane encapsulation may allow for additional information via optical detection means.

In some embodiments the source reservoir 161 and/or target reservoir 162 are enclosed by the housing 160.

In some embodiments the system 100 is arranged to be an in-vitro system. In some embodiments the system 100 is arranged to be an in-vivo system.

In some embodiments the source reservoir 161 and/or target reservoir 162 each comprise an inner surface arranged to be in contact with the electrolyte 151,152 and a corresponding at least partially enclosed inner volume, wherein part of the ion exchange membrane 110 is arranged inside said volume of each reservoirs 161,162.

In some embodiments the source reservoir 161 and/or target reservoir 162 each comprises an inner surface arranged to be in contact with electrolyte 151,152, wherein the ion exchange membrane 110 is in contact with the reservoir 161,162 through an opening in said inner surface and the ion exchange membrane 110 forms the inner surface in said opening of the reservoir 161,162. In some of these embodiments the opening in said inner surface is a region of the inner surface of a reservoir 161,162 that upon addition of electrolyte 151,152 would be below the waterline.

FIG. 1c depicts schematically the devices of the system 100 described in FIG. 1a that act and/or measure upon the ionic exchange membrane 110. FIG. 1c depicts the ionic exchange membrane 110 directly or indirectly connected to the source 140 and the impedance analyser 120. The source 140 and the impedance analyser 120 are arranged to communicate data to the computer 170. In this example the computer 170 is arranged to communicate with and obtain predetermined reference data for the ion exchange membrane 110 from a memory storage 171.

It is to be understood that the term computer may refers to any electronic circuitry able to obtain data and perform calculations.

In some embodiments the computer 170, the memory storage 171, the source 140, and/or the impedance analyser 120 are comprised in the same device and/or housing.

In some embodiments the source 140 and/or the impedance analyser 120 are arranged to continuously provide data indicative of the ion exchange membrane 110 and any species therein to the computer 170, whereby the computer 170 may continuously create the obtained impedance, voltage and/or current data. It is to be understood that the measured impedance, voltage data and/or current data comprises timestamps arranged to allow data from the source 140 and the impedance analyser 120 to be correlated in time.

In some embodiments the computer 170 is arranged to obtain the predetermined reference data from a memory storage 171 connected to and/or comprised in said computer 170.

In some embodiments, upon determining the presence of two or more species in said sample, the obtained predetermined reference data comprises a set of values indicative of reference impedances data corresponding to a mixture comprising at least two of said species. In some of these embodiments the obtained predetermined reference data comprises a set of values indicative of reference impedances data corresponding to at least one mixture of every combination of said two or more species, such as equal parts AB AC BC and ABC for the three species A, B and C.

In some embodiments the computer 170 is arranged further arranged to determine a probability value indicative of a determined probability of the presence of each at least one species above a predetermined threshold concentration.

In some embodiments the computer 170 is further arranged to control the source 140 and/or the impedance analyser 120.

In some embodiments the computer 170 is arranged to, upon performing a calibration, update the predetermined reference data for the ion exchange membrane 110 based on obtained source data, obtained impedance data, and obtained calibration data.

In some embodiments the voltage and/or current source 140 is arranged to record the applied voltage and the current. In some of these embodiments the computer 170 is arranged to provide a faulty system measurement states error based on obtained voltage and current information from said source 140, such as value that may be measured if the ion exchange membrane 110 is insufficiently hydrated. In some of these embodiments the computer 170 may be arranged to provide a determined measurement reliability value based on the obtained voltage and current information from said source 140 indicative of at least one determined risk, such as providing a value of 1 if at least one voltage-current mismatch criteria is fulfilled and otherwise a value of zero.

The term species refers to chemical species and biomolecules. The species may for example be potassium ions (K+), acetylcholine (Ach+), or gamma-aminobutyric acid (GABA). The species may be charged in the measurement conditions and/or provided charge by binding to other charged species, such as binding sodium dodecyl sulphate (SDS) to proteins.

The term species to be identified herein refers to the species which the system or method attempts to determine the presence of in a sample. The species to be identified typically requires corresponding reference data to reliably detect the presence of said species for at least some electrolytes or situations. The corresponding reference data may comprise diffusion coefficients, and reference impedance curves for the species to be identified.

The term ionic exchange membrane refers to a structure arranged to allow at least some species to be transported through said structure upon application of an electric field. The term ionic exchange membrane is sometimes referred to as ion conductive channel. The ionic exchange membrane may for example be a cation exchange membrane, or an anion exchange membrane.

The term electrolyte refers to an electrically conducting solution. The electrolyte may for example be water comprising a buffer system and the species to be analysed. In the system electrolyte is typically added to system to form a closed circuit and/or to provide the species to be analysed.

The term source refers to a device or arrangement arranged to provide a current or to provide a voltage, and being arranged to provide source data indicative of the current and/or voltage being provided. The source may for example be a source measure unit (SMU).

The term computer refers to a electronic circuitry arranged to determine the presence of the at least one species in a sample based on obtained reference data, source data and impedance data, and/or is arranged control the source and/or the impedance analyser. The computer may for example be electronic circuitry connected to and/or integrated into the source and/or the impedance analyser.

The term predetermined reference data refers to data indicative of interactions between the ionic exchange membrane and the at least one species to be identified, such that predetermined reference data may be compared to measurement data in order to determine the presence of each of said at least one species. The predetermined reference data may for each species comprise values indicative of the rate of electromigration through the ionic exchange membrane, and the impedance reference curve for said species in the ionic exchange membrane. The predetermined reference data may, when two or more species are to be identified, comprise the impedance reference curve for mixtures comprising at least two of said species.

The term reservoir refers to an enclosed or partially enclosed volume and the walls thereof. The reservoir may for example be a cylinder with one side open, or a cuboid with one face open. The reservoir may be a microfluidic reservoir, or part of a port.

Figure 2:
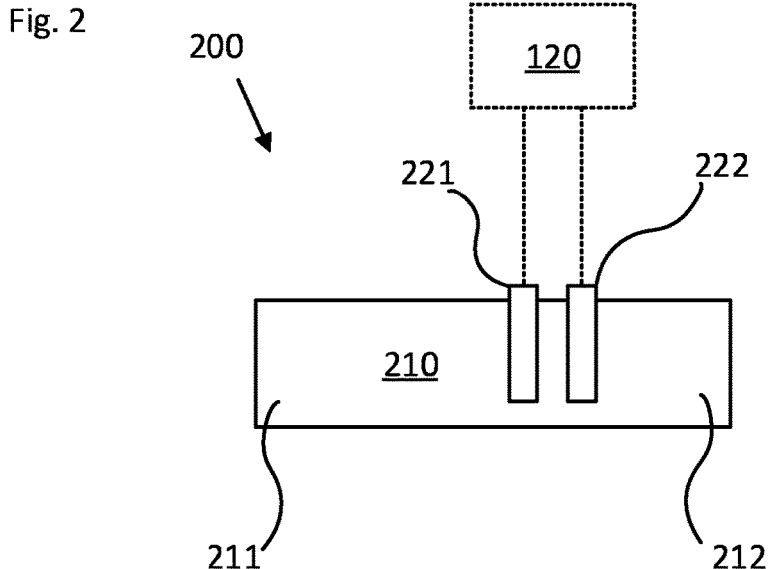
FIG. 2 depicts schematically a device for detection and identification of at least one species in a sample in an ionic exchange membrane.

FIG. 2 depicts schematically a device for detection and identification of at least one species in a sample in an ionic exchange membrane 210. The example device comprises an ion exchange membrane 210, and two impedance electrodes 221,222 arranged at said ion exchange membrane 210. The two impedance electrodes 221,222 being arranged to be connected to and used to measure impedance at a part of the ion exchange membrane 210 with an impedance analyser 120. The device being arranged to replace the corresponding parts in a system such as described for FIG. 1a-c.

In some embodiments the ion exchange membrane 210 comprises a first region 211 and a second region 212, wherein the ion exchange membrane 210 is configured to allow at least some species to travel from the first region 211 to the second region 212 through the ion exchange membrane 210.

Figure 3:
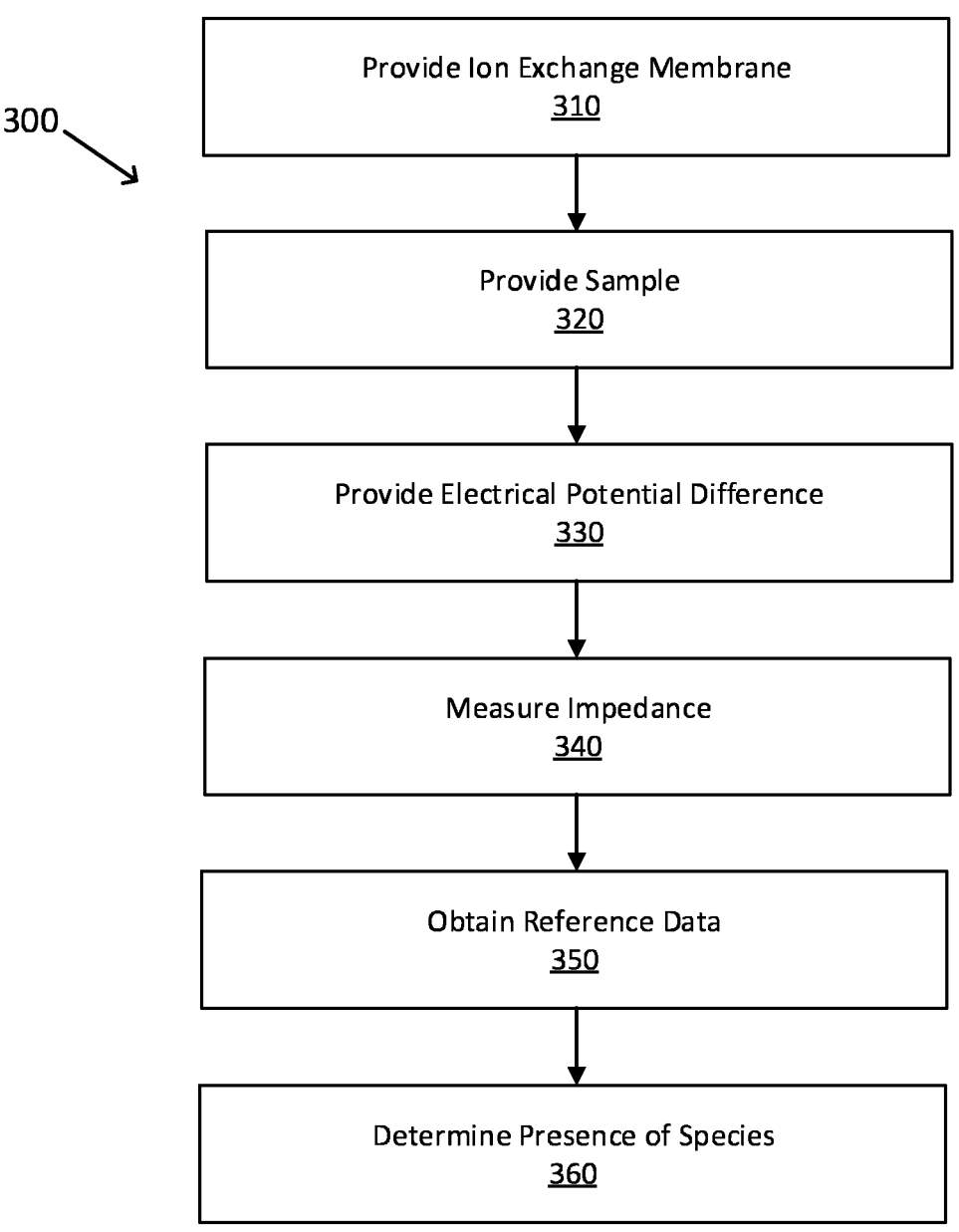
FIG. 3 depicts schematically a method for detection and identification of at least one species in a sample in an ionic exchange membrane.

FIG. 3 depicts schematically a method 300 for detection and identification of at least one species in a sample in an ionic exchange membrane, the method comprises the steps of providing 310 a ion exchange membrane, at least two impedance electrodes arranged at said ion exchange membrane, a source electrolyte at a first region of the ion exchange membrane, and a target electrolyte at a second region of the ion exchange membrane, providing 320 said sample at the ion exchange membrane, providing 330 an electrical potential difference between the first and second region of the ion exchange membrane by applying a potential difference between a source electrode in ionic contact with the source electrolyte and a target electrode in ionic contact with the target electrolyte, measuring 340 impedance between the at least two impedance electrodes by applying an alternating voltage in the frequency range of 1 kHz to 1 MHz, and recording the potential difference between and/or current through the source electrode and target electrode, obtaining 350 predetermined reference data for the ion exchange membrane comprising for each at least one species a set of values indicative of diffusion coefficients and reference impedances data corresponding to said species, and determining 360 the presence of said at least one species in said sample based on the recorded voltage and/or current, the measured impedance, and the predetermined reference data for the ion exchange membrane.

In some examples providing 320 the sample comprises the source electrolyte being the sample. In some examples providing 320 the sample comprises providing sample at the first region and/or at another part of the ion exchange program. In some of these examples the step of providing 320 the sample comprises utilizing microfluidic transport means to provide sample at the ion exchange membrane.

In some examples determining 360 the presence of the at least one species in said sample, upon said sample being a calibration sample, further comprises updating the predetermined reference data for the ion exchange membrane.

Figure 4:
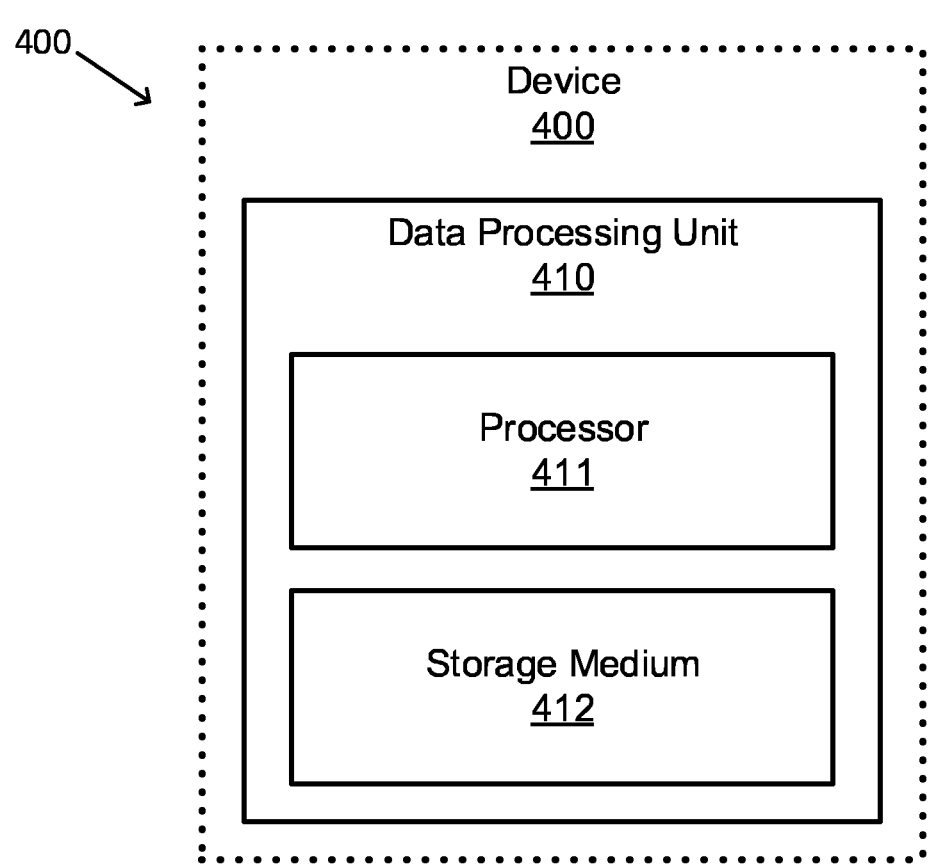
FIG. 4 depicts schematically a data processing unit comprising a computer program product.

FIG. 4 depicts schematically a data processing unit 410 comprising a computer program product for detection and identification of at least one species in a sample in an ionic exchange membrane. FIG. 4 depicts a data processing unit 410 comprising a computer program product comprising a non transitory computer-readable storage medium 412. The non-transitory computer-readable storage medium 412 having thereon a computer program comprising program instructions. The computer program is loadable into a data processing unit 410 and is configured to cause a processor 411 to carry out the method for detection and identification of at least one species in said sample in an ionic exchange membrane in accordance with the description of FIG. 3.

The data processing unit 410 may be comprised in a device 400. The device 400 may be the computer 170 described in FIG. 1c.

Figures 5A, 5B:
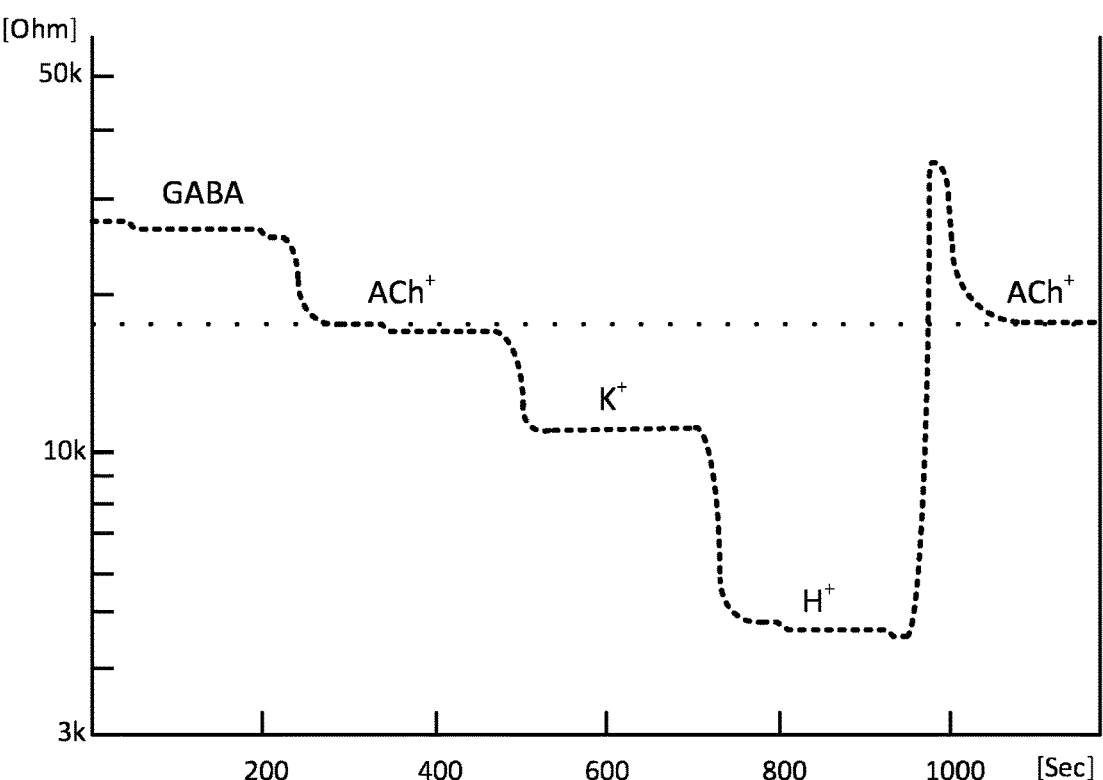
FIG. 5a-b depicts impedance measurements for different ionic species.

FIG. 5a-b depicts impedance measurements for different ionic species. FIG. 5a depicts impedance measurement data corresponding to different ionic species passing a pair of impedance electrodes measuring at 5 kHz and 20V potential. FIG. 5a depicts gamma-Aminobutyric acid (GABA), acetylcholine (Ach$^+$), potassium ions (K$^+$), hydrogen ions (H$^+$) and acetylcholine (Ach$^+$) passing through the impedance measurement region in that order. Concentration of all ionic species 100 mM.

FIG. 5b depicts an example simulated impedance in an ion exchange membrane during separation of a set of species, A, B, C, D, and E. The diffusion coefficients of said set of species having the relationship of A<B<C<D<E for said ion exchange membrane. This example simulated impedance represents allowing a mixture of the set of species to be separated in said ion exchange membrane and then measuring impedance at different positions along the ion exchange membrane.

Returning to FIG. 1a-c, an example scenario using systems 100 for detection and identification of at least one species in a sample in an ionic exchange membrane 110 will be described. In said example scenario said sample consisting of an aqueous solution containing two cationic species will be separated in the ion exchange membrane 110 under an applied electric field, detected at the impedance electrodes 121,122, and identified by the computer 170.

In the example scenario the system 100 comprises a source reservoir 161 and a target reservoir 161, wherein during operation the source reservoir 161 contains sample to be analysed, and the target reservoir 162 contains a known aqueous solution. The source reservoir 161 and the target reservoir 162 are separated by an ionic exchange membrane 101, which in this example scenario is a cation exchange membrane. The whole ionic exchange membrane 110 except the first region 111 (interface towards source reservoir 161) and the second region 112 (interface towards target reservoir 162) is encapsulated with a dielectric layer arranged to keep the ionic exchange membrane 110 hydrated during operation.

The example system 100 further comprises a pair of impedance electrodes 121,122 arranged at the ion exchange membrane 110. The pair of impedance electrodes 121,122 are 200 μm wide and are arranged next to each other on one side of the ion exchange membrane 110 with a spacing of 100 μm. The pair of impedance electrodes 121,122 are connected to an impedance analyser 120, wherein said impedance electrodes 121,122 and the impedance analyser 120 are arranged to measure impedance at 5 kHz. The system 100 further comprises a source electrode 141 in the source reservoir 161, and a target electrode 142 in the target reservoir 162. Said source electrode 141 and target electrode 142 are connected to a voltage source 140 and are redox capable. The system 100 further comprises a computer 170 connected to the impedance analyser 120 and the voltage source 140.

In the example scenario, in an initial step, the target reservoir 162 is filled with the known aqueous solution serving as the target electrolyte 152, whereby the ionic exchange membrane 110 becomes hydrate. Thereafter the sample is added into the source reservoir 161 serving as the source electrolyte 151, thereby forming a path for charged species from the source electrode 141 to the target electrode 142. By applying a +10 V potential difference between the source electrode 141 and the target electrode 142 by utilizing the voltage source 140, the two cationic species of the sample undergo electrophoresis and move towards the target electrolyte 151. In this example scenario the two cation species undergo separation as they are transported through the ion exchange membrane.

In this example the voltage source 120 records the applied voltage and the resulting current, and provides said recording to the computer 170. The impedance analyser 120 measures the impedance with a constant frequency of 5 kHz and a constant AC voltage of 10 mV, and provides said impedance measurement to the computer 170. The cation species are detected at the impedance electrodes 121,122. The arrival time to the impedance electrodes 121,122 for each cation species is based on the applied voltage and the interaction between the species and the ion exchange membrane 110.

The computer 170 compares the obtained applied voltage data, and the obtained impedance data with predetermined reference data for the ion exchange membrane 110 obtained from a memory storage 171. In this example scenario the predetermined reference data comprises for each of the two cation species a set of values indicative of diffusion coefficients and reference impedances data corresponding to said species and combinations thereof. The computer 170 determines the presence of the species in the sample based on the comparison, whereby said two cations are identified in the sample.

The invention claimed is:

1. A system (100) for detection and identification of at least one species in a sample in an ionic exchange membrane (110), the system (100) comprising:
    an ion exchange membrane (110),
    at least two impedance electrodes (121,122),
    an impedance analyser (120), a source electrode (141),
    a target electrode (142),
    a voltage and/or current source (140), and
    a computer (170),
    wherein the at least two impedance electrodes (121,122) are arranged at the ion exchange membrane (110) and are connected to the impedance analyser (120), and wherein said impedance electrodes (121,122) and said impedance analyser (120) are arranged to perform impedance measurements comprising timestamps on at least part of the ion exchange membrane (110),
    wherein the source electrode (141) and a first region (111) of the ion exchange membrane (110) are arranged to, upon addition of a source electrolyte (151) at said first region (111), be in indirect ionic contact via said source electrolyte (151),
    wherein the target electrode (142) and a second region (112) of the ion exchange membrane (110) are arranged to, upon addition of a target electrolyte (152) at said second region (112), be in indirect ionic contact via said target electrolyte (152),
    wherein the source electrode (141) and the target electrode (142) are connected to said voltage and/or current source (140),
    wherein said source (140) is arranged to form a closed electrical circuit through the system upon addition of the source electrolyte (151) at the first region (111) of the ion exchange membrane (110) and addition of the target electrolyte (152) at the second region (111) of the ion exchange membrane (110), and wherein said source (140) is arranged to provide an electric potential difference between the first (111) and second region (112) of the ion exchange membrane (110),
    wherein the ion exchange membrane (110) is arranged to provide a path through said ion exchange membrane (110) for at least part of said sample, and
    wherein the computer (170) is configured to:
        obtain source data comprising voltage data and/or current data comprising timestamps from said source (140),
        obtain impedance data from the impedance analyser (120),
        obtain predetermined reference data comprising for each of said at least one species a set of values indicative of diffusion coefficients and reference impedances data for said species in the ion exchange membrane (110),
        determine a transport time based on said impedance data comprising timestamps; and
        determine the presence of said at least one species in said sample based on the obtained source data, the obtained impedance data, and obtained predetermined reference data, said determining of the presence of said at least one species being based on comparing the determined transport time and measured impedance data with said predetermined reference data.

2. The system according to claim 1, further comprising a source reservoir (161) arranged to contain the source electrolyte (151) and a target reservoir (162) arranged to contain the target electrolyte (152),
    wherein the source electrode (141), the target electrode (142), the first region (111) and the second region (112) of the ionic exchange membrane (110) are at least partially arranged in or at each respective reservoir (161,162).

3. The system according to claim 1, wherein the ion exchange membrane (110) and/or the at least two impedance electrodes (121,122) are arranged to be replaced.

4. The system according to claim 1, wherein the distance between the first region (111) and/or second region (112) of the ion exchange membrane (110) and any of said impedance electrodes (121,122) along the ion exchange membrane (110) is 1-100 mm.

5. The system according to claim 1, comprising at least four impedance electrodes (121,122) arranged at the ion exchange membrane (110) as at least two pairs of impedance electrodes (121,122), wherein each pair of impedance electrodes (121,122) and said impedance analyser is arranged to measure impedance in a part of the ion exchange membrane (110).

6. The system according to claim 1, wherein the computer, upon determining the presence of two or more species in said sample, is arranged to obtain predetermined reference data comprising a set of values indicative of reference impedances data corresponding to at least one mixture comprising two of said species.

7. A device for detection and identification of at least one species in a sample in an ionic exchange membrane, the device (200) comprises an ionic exchange membrane (210), and at least two impedance electrodes (221,222) arranged at the ionic exchange membrane (210), wherein the device (200) is arranged for use in the system (100) according to claim 1.

8. A method (300) for detection and identification of at least one species in a sample in an ionic exchange membrane, the method comprises the steps of:

providing (310) a ion exchange membrane (110), at least two impedance electrodes (121,122) arranged at said ion exchange membrane (110), a source electrolyte (151) at a first region (111) of the ion exchange membrane (110), and a target electrolyte (152) at a second region (112) of the ion exchange membrane (110), providing (320) the sample possibly comprising said at least one species at the ion exchange membrane, providing (330) an electrical potential difference between the first (111) and second region (112) of the ion exchange membrane (110) by applying a potential difference between a source electrode (141) in ionic contact with the source electrolyte (151) and a target electrode (142) in ionic contact with the target electrolyte (152), wherein providing (330) the electrical potential difference comprising recording voltage data and/or current data comprising timestamps, measuring (340) impedance comprising timestamps between the at least two impedance electrodes (121, 122) by applying an alternating voltage in the frequency range of 1 kHz to 1 MHz, and recording potential difference between and/or current through the source electrode (141) and target electrode (142), obtaining (350) predetermined reference data for the ion exchange membrane (110) comprising for each of said at least one species a set of values indicative of diffusion coefficients and reference impedances data corresponding to said species, and determining (360) the presence of said at least one species in said sample based on the recorded voltage data and/or current data, the measured impedance, and the predetermined reference data for the ion exchange membrane (110), wherein said determining (360) the presence of said at least one species comprises determining a transport time based on said impedance data comprising timestamps, said determining of the presence of said at least one species being based on comparing the determined transport time and measured impedance data with said predetermined reference data.

9. A computer program product comprising a non-transitory computer-readable storage medium (412) having thereon a computer program comprising program instructions, the computer program being loadable into a processor (411) and configured to cause the processor (411) to perform the method (300) for detection and identification of at least one species in a sample in an ionic exchange membrane (110) according to claim 8.

\* \* \* \* \*